United States Patent [19]

McAvoy et al.

[11] 3,757,048

[45] Sept. 4, 1973

[54] ALPHANUMERIC AUDIO RESPONSE TERMINAL UNIT

[75] Inventors: John A. McAvoy, Fenton; Eugene F. Banka, Livonia; Terry G. Griner, Westland; Robert C. Hagemann, Farmington, all of Mich.

[73] Assignee: Burroughs Corporation, Detroit, Mich.

[22] Filed: Nov. 5, 1971

[21] Appl. No.: 196,041

[52] U.S. Cl. ........................... 179/2 DP, 179/84 VF

[51] Int. Cl. ........................................ H04m 11/06

[58] Field of Search ..................... 179/2 DP, 84 VF, 179/1 C, 2 C, 3, 4, 2 A, 2 R, 90 K; 340/365; 178/17 R, 17 C

[56] References Cited

UNITED STATES PATENTS

| | | | |
|---|---|---|---|
| 3,516,062 | 6/1970 | Spraker | 179/2 DP |
| 3,649,770 | 3/1972 | Hale | 179/84 VF |
| 3,675,513 | 7/1972 | Flanagan | 179/84 VF |
| 3,355,709 | 11/1967 | Hanus | 325/320 |

*Primary Examiner*—Kathleen H. Claffy
*Assistant Examiner*—Thomas D'Amico
*Attorney*—Paul W. Fish, Ralzemond B. Parker et al.

[57] ABSTRACT

Described herein is an audio terminal unit with an alphanumeric keyboard having a reticulated grid overlying the keyboard limiting key depression to a single key for entering data information to be encoded into a three of 12 frequency coding for communication with a central processor over telephone lines. The received signals are broadcast through an output speaker unit that is positioned and mounted within the terminal in such a manner as to reduce cross talk and magnetic coupling among the speaker, the acoustic and magnetic transducers and the circuit transformers.

2 Claims, 11 Drawing Figures

INVENTORS
JOHN A. McAVOY
EUGENE F. BANKA
TERRY G. GRINER
ROBERT C. HAGEMANN
BY Russel C. Wells
ATTORNEY

FIG. 11

| KEY NO. | KEY | TONE A | ENCODER B | ENCODER B′ | KEY NO. | KEY | TONE A | ENCODER B | ENCODER B′ |
|---|---|---|---|---|---|---|---|---|---|
| 1 | A | 2 | 3 | 1 | 33 | 4 | 2 | 1 | 1 |
| 2 | B | 2 | 3 | 2 | 34 | 5 | 2 | 2 | 2 |
| 3 | C | 2 | 4 | 1 | 35 | 6 | 2 | 3 | 3 |
| 4 | D | 2 | 4 | 2 | 46 | 7 | 3 | 1 | 1 |
| 5 | E | 3 | 4 | 2 | 47 | 8 | 3 | 2 | 2 |
| 14 | F | 1 | 4 | 3 | 48 | 9 | 3 | 3 | 3 |
| 15 | G | 1 | 3 | 4 | 59 |  | 4 | 1 | 1 |
| 16 | H | 1 | 1 | 2 | 12 | NORM | 1 | 2 | 3 |
| 17 | I | 1 | 1 | 3 | 13 | WILL CALL | 1 | 2 | 4 |
| 18 | J | 1 | 1 | 4 | 32 | R1 | 1 | 2 | 1 |
| 27 | K | 2 | 4 | 3 | 24 | R3 | 1 | 4 | 4 |
| 28 | L | 2 | 3 | 4 | 50 | CRIT | 2 | 4 | 4 |
| 29 | M | 2 | 1 | 2 | 26 | P.P. | 2 | 2 | 4 |
| 30 | N | 2 | 1 | 3 | 25 | PKG. DEL | 2 | 2 | 3 |
| 31 | Ø | 2 | 1 | 4 | 64 | BUS | 2 | 2 | 1 |
| 40 | P | 3 | 4 | 3 | 11 | LAST PART | 3 | 4 | 1 |
| 41 | Q | 3 | 3 | 4 | 63 | UNIT DOWN | 3 | 4 | 4 |
| 42 | R | 3 | 1 | 2 | 38 | AIR | 3 | 2 | 3 |
| 43 | S | 3 | 1 | 3 | 8 | REPEAT | 3 | 3 | 1 |
| 44 | T | 3 | 1 | 4 | 39 | PPSD | 3 | 2 | 4 |
| 53 | U | 4 | 4 | 3 | 19 | F2 | 3 | 3 | 2 |
| 54 | V | 4 | 3 | 4 | 45 | R2 | 3 | 2 | 1 |
| 55 | W | 4 | 1 | 2 | 37 | MULT-ORDER | 4 | 3 | 3 |
| 56 | X | 4 | 1 | 3 | 10 | VERIFY | 4 | 3 | 1 |
| 57 | Y | 4 | 1 | 4 | 62 | SEND | 4 | 4 | 1 |
| 58 | Z | 4 | 2 | 1 | 51 | PREM AIR | 4 | 2 | 3 |
| 60 | 0 | 4 | 2 | 2 | 9 | CANCEL | 4 | 4 | 2 |
| 20 | 1 | 1 | 1 | 1 | 52 | REA | 4 | 2 | 4 |
| 21 | 2 | 1 | 2 | 2 | 6 | F1 | 4 | 3 | 2 |
| 22 | 3 | 1 | 3 | 3 | 61 | R4 | 4 | 4 | 4 |

ALPHANUMERIC AUDIO RESPONSE TERMINAL UNIT

BACKGROUND OF THE INVENTION

1. Field of Invention

This invention relates to the field of telephony in general and in particular to audio terminal units.

2. Prior Art

Many audio data sets provide means to send only numeric characters over existing telephone lines by a separate twelve key keyboard having an attachable acoustic coupler that is strapped on to the transmitter portion of a handset. The received signals are broadcast only by the handset and are therefore audible to only the operator holding the handset against her ear.

As a further improvement to the above, the twelve key keyboard was replaced by an alphanumeric keyboard. Again, the operator had to maintain physical control of the handset for two-way communication between the terminal unit and the central processor.

SUMMARY OF INVENTION

It is an object of this invention to integrate the transmission and reception of multi-tone frequency data communication into one compact and portable terminal.

It is another object of this invention to reduce the cross coupling vibration between the speaker and the magnetic transducers by an improved resilient mounting of the speaker.

It is still another object of this invention to prevent extraneous signal generation by preventing inadvertent depression of two or more keys at any one time.

An audio response terminal unit has an alphanumeric keyboard for entering alphanumeric data information to be communicated over telephone lines to a central processor. The output of the keyboard is coupled to three encoders to develop a control signal for actuating a frequency or tone generator. The multi-frequency signals generated from the tone generator are acoustically coupled to the transmitter of a telephone handset for transmission over a communication channel to a central processor. The audio response from the central processor is coupled to the receiver of the handset through a magnetic coupler to a speaker unit for broadcasting. The speaker unit comprises a megaphone attached to a speaker to direct the sound waves therefrom. The speaker unit is resiliently cushioned from the frame of the terminal unit in an improved manner to isolate any vibrations between the speaker and the transducers. Another feature of the invention is a mechanical provision for preventing inadvertent depression of two or more adjacently located keys of the keyboard, the provision taking the form of a recticulated frame or grid overlaid upon the keyboard so that the keys thereof extend upwardly through the apertures of the grid and have their key tops terminating substantially flush with the upper surface of the grid.

DESCRIPTION OF THE DRAWINGS

In the Drawings:

FIG. 11 is a chart identifying each key in the keyboard of the audio terminal of FIG. 3 by its keyboard position and the component frequencies generated by the audio terminal.

DETAILED DESCRIPTION

Figure 1:
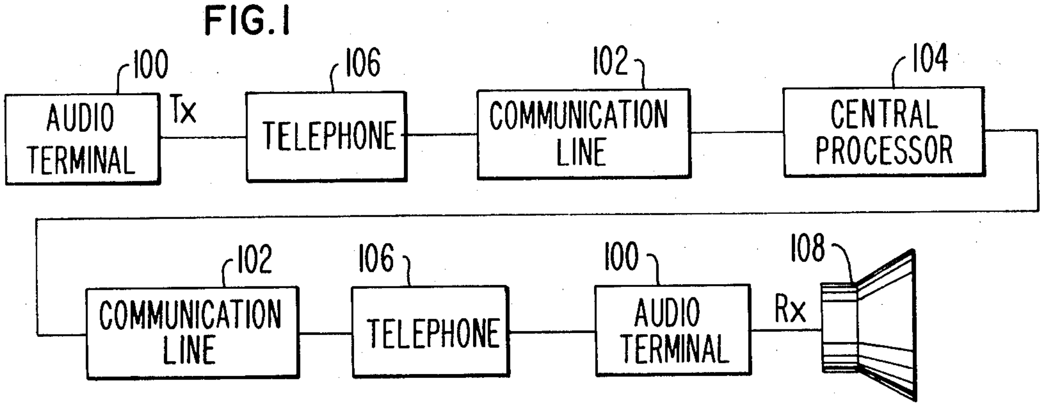
FIG. 1 is a block diagrammatic view of a data communication system using an audio terminal.

Referring to the Figures by character of reference, there is illustrated in FIG. 1 a data communication system comprising an audio terminal 100 which may be a portable unit, a telephone communication line 102 and a central processor 104. Data to be transmitted from a remote site to a central processor 104 is entered into the audio terminal 100 in serial form. The audio terminal 100 encodes the information which is entered therein into a three of 12 transmission code signals for transmission by a telephone 106 over the communication line 102 to the central processor 104. The central processor 104 receives the transmission code signals from the communication line 102, decodes the signals into the proper signals for use by the central processor 104. After the central processor 104 decodes the signals and operates on the signals, in accordance with the program therein, an audio reply is generated by the central processor and sent over the communication line 102 back through the telephone 106 to the audio terminal 100. The audio terminal 100 receives the signals in a magnetic transducer and then broadcasts the signals through a speaker 108.

Figure 2:
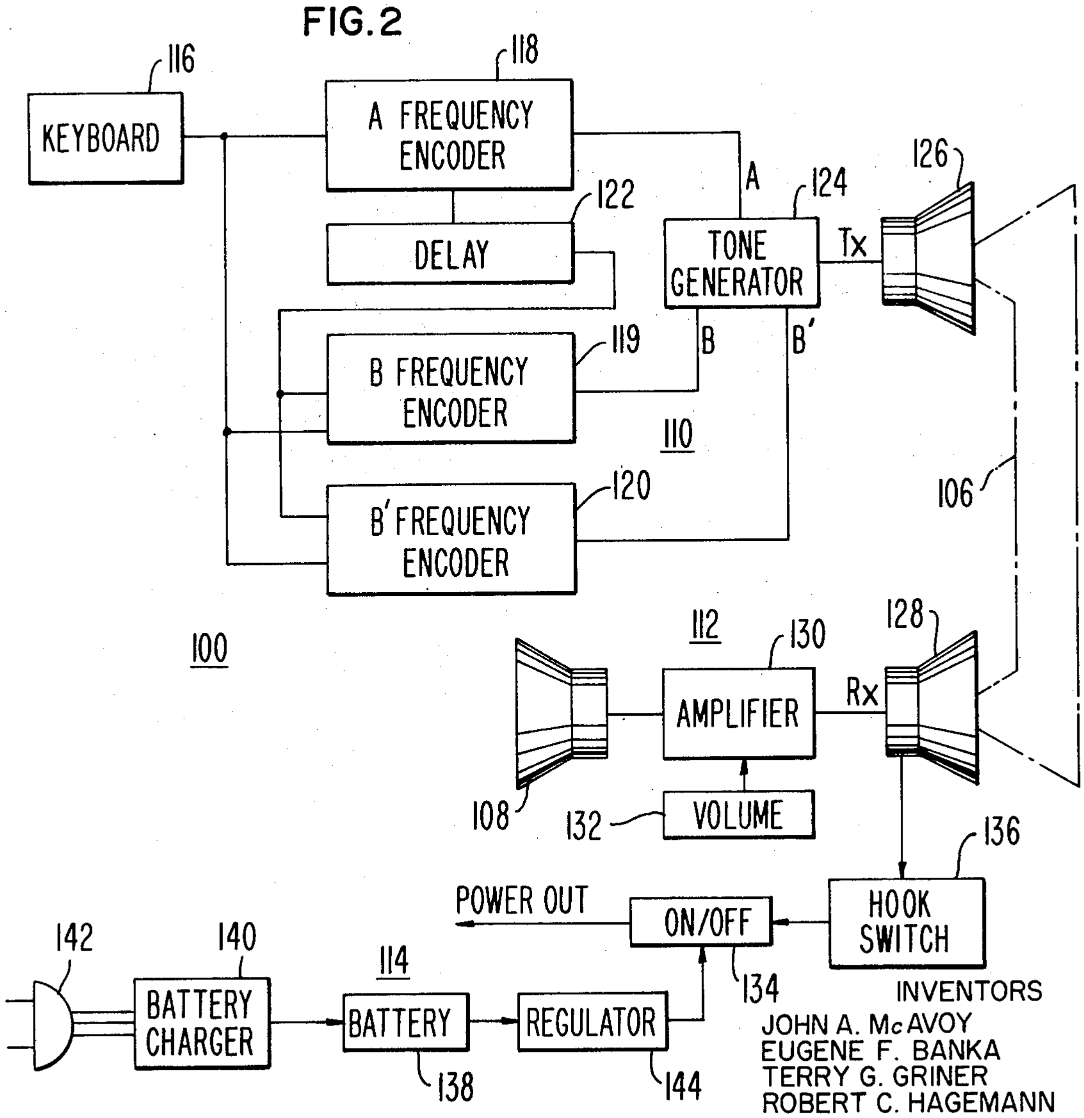
FIG. 2 is a block schematic of the audio terminal of FIG. 1.

The audio terminal 100 of FIG. 1 is illustrated more particularly in the block diagrammatic form in FIG. 2. The audio terminal 100 comprises three sections, the transmit section 110, the receive section 112 and the control section 114. The transmit section 110 comprises the keyboard 116, three encode units 118–120 including a delay unit 122, a tone generator 124 and an acoustic transducer unit 126.

In the preferred embodiment, the keyboard 116 is a five by 13 or 65 alphanumeric keyboard having several control keys. Information to be transmitted is entered into the keyboard 116 is encoded in the encode units 118–120 into three different frequency control signals; namely, A, B and B'. In a manner as will hereinafter be shown, the A frequency control signal generates a delay signal which controls the time of the B frequency control signal and delays the generation of the B' frequency control signal for a predetermined period of time. From the encoders 118–120 each of the control signals, A, B and B' are supplied to the tone generator 124 for generation of the several frequencies. The tone generator 124 used is compatible with the telephone system requirements and in particular may be the commercially available ML8900 microelectronic tone generator as developed and marketed by Microsystems International of Ottawa, Canada. The output of the tone generator 124 is supplied to an acoustic transducer 126 coupling the frequencies generated from the tone generator 124 to the handset of the telephone 106.

In the preferred embodiment the following table lists the frequencies transmitted for the A B B' code. There are four frequencies associated with the A code, namely A1, A2, A3 and A4 and similarly four frequencies with both the B and B' code. Since, as will hereinafter be shown, neither B and B' portions of the code are transmitted simultaneously, therefore, both the B and B' frequencies are from the same generators.

Frequencies — Hertz

| | | | |
|---|---|---|---|
| A1 | 697 | B1 & B'1 | 1209 |
| A2 | 770 | B2 & B'2 | 1336 |
| A3 | 852 | B3 & B'3 | 1477 |
| A4 | 941 | B4 & B'4 | 1633 |

The receiver portion 112 of the audio terminal 100 comprises magnetic transducer 128, an audio amplifier 130 including a volume control 132, and a speaker unit 108. The handset of the telephone 106 is placed in contact with the magnetic transducer 128 coupling the signals from the communication line 102 to the audio amplifier 130. The amplifier 130 receives the signals from the handset, amplifies them to drive the speaker 108. The volume control 132 controls the power output of the amplifier 130 for controlling the audio output level of the speaker 108.

The control unit 114 comprises the power supply unit, a manual on-off switch 134 and a hook switch 136. In the preferred embodiment, the audio terminal 100 is powered by a battery unit 138 which may be coupled through a battery charger 140 to an AC line 142. The output of the battery 138 is as by regulator component 144 to the several voltages required in the receiver portion 112 and the transmitter portion 110. The audio terminal unit 100 may be operated on batteries if there are no AC terminals available making the audio terminal unit portable. In order to supply power to the audio terminal unit 100, the on-off switch 134 must be placed in the "on" position and the hook switch 136 must be activated by a handset being placed in the proper position in the audio terminal 100. If both of these conditions are not satisfied, then the audio terminal unit 100 will not be powered.

Figure 3:
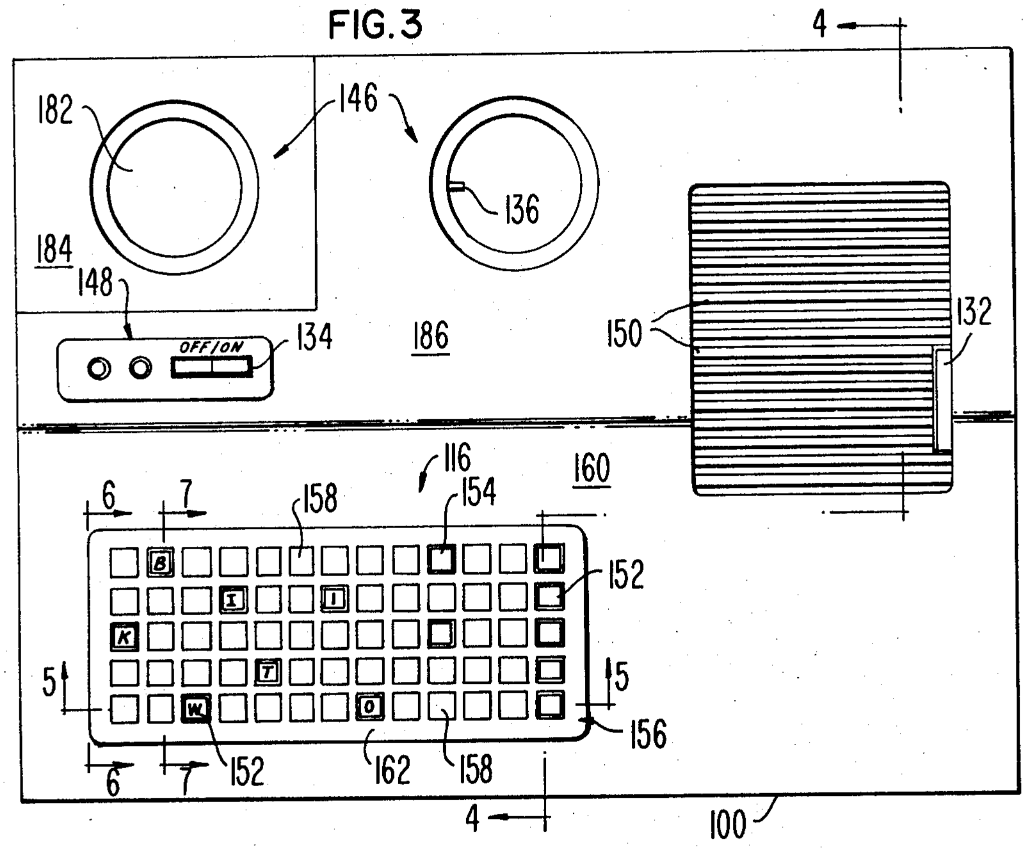
FIG. 3 is a top plan view of the audio terminal of FIG. 2.

Referring to FIG. 3 there is illustrated the physical appearance of the audio terminal 100 according to the present invention. As noted, the audio terminal comprises a keyboard 116, an acoustic coupler unit 146, the control switches 148 and the speaker output 150.

In the preferred embodiment as previously stated, the keyboard is a five by 13 alphanumeric keyboard having several control keys. In FIG. 11 the identity of the several keys in an inventory ordering application is listed. The keys 152 are numbered from left to right starting in the upper left corner of the keyboard 116; the upper row contains keys 1 to 13, the next row 14 to 26, the third row 27 to 39, the fourth row 40 to 52 and the bottom row 53 to 65. After the central processor 104 is dialed up over the communication line 102 by means of the telephone 106, the handset is positioned in the audio terminal unit 100 with the transmission portion of the handset position to the left on the audio terminal unit. the operator indexes an identifying code of alphabetic and numeric characters into the keyboard 116 in serial order and then depresses one of the control keys such as the verify key 154 in position ten. The central processor 104 responds and the operator than indexes each item of inventory followed by the verify key 154. When the ordering is completed, the operator by indexing one of the other control keys sets the mode of shipping the inventory and ultimately signs off to the central processor 104. The handset is then replaced on the cradle of the telephone 106 and the portability of the audio terminal unit 100 allows it to be moved to a new location.

Figure 4:
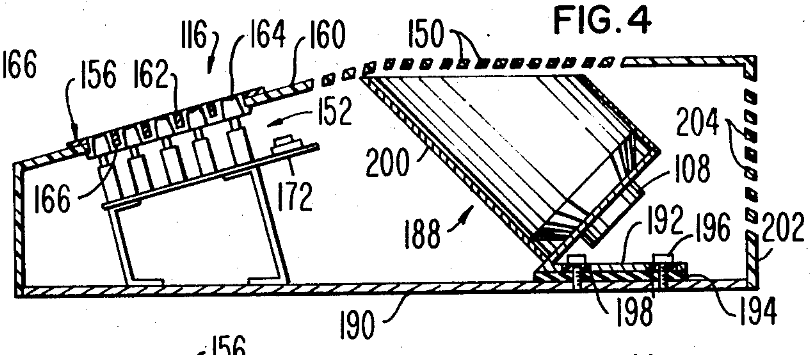
FIG. 4 is a sectional view taken along the line 4—4 of FIG. 3.

Forming a part of the keyboard 116 assembly is a one-piece reticulated frame or grid 156 which is shaped to overlie the keyboard with the apertures 158 therein registering with the keys 152 of the keyboard so that the latter may project upwardly therein to the level of the upper surface of the grid 156. The grid 156 therefore has as many apertures therein as there are keys of the keyboard. The grid 156 is preferably formed of moldable material, such as plastic, and molded into the one-piece construction illustrated. The grid 156 is shaped on its margins for releasable interlocking engagement with the top wall 160 of the casing of the terminal unit with the upper surface 162 of the grid extending flush with the key tops 146 of the keyboard as illustrated in FIGS. 4, 5 and 8.

Figure 5:
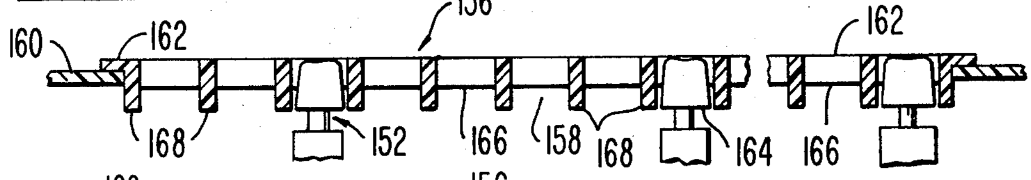
FIG. 5 is a fragmentary sectional view taken along line 5—5 of FIG. 3 showing the crossing ribs of the keyboard grid.
Figures 6, 7:
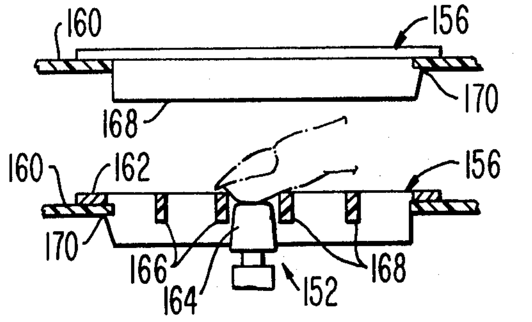
FIG. 6 is a fragmentary sectional view taken along line 6—6 of FIG. 3.
FIG. 7 is a fragmentary sectional view taken along line 7—7 of FIG. 3 showing the depression of a key in the keyboard grid.

With more specific reference to FIGS. 5 to 7 inclusive, the reticulated grid 156 is formed or molded with crossing ribs, the longitudinal ribs being designated 166 and the transversing ribs as 168, the latter being preferably about twice the depth of the former for strengthening purposes. The outer ends of certain of the transverse ribs may be notched as shown at 170 for snap-fitting engagement with opposite edges of the keyboard opening in the top wall 160 of the audio terminal unit 100 to normally lock the grid 156 against dislodgment from the unit. The keys 152 and their respective electrical actuating mechanisms are mounted as shown in FIGS. 4 and 8 upon a platform 172 slanted so as to extend parallel with the inclined top wall 160 of the unit. The platform 172 may be a printed circuit board to certain of the conductors of which the leads from the electrical actuating mechanism extend. The key tops 164 lie within the apertures 158 of the grid 156 in the raised condition of the key 152, but are depressible approximately the depth of the longitudinal ribs 166 as indicated in FIG. 7. Each key top 164, in response to finger depression, will move downwardly with respect to the grid 156 within the four walls of the aperture 158 within which it is received. The four walls prevent the finger of the operator from straying or overlapping upon an adjacent key thus preventing two or more keys 152 to be depressed at the same time.

Figure 8:
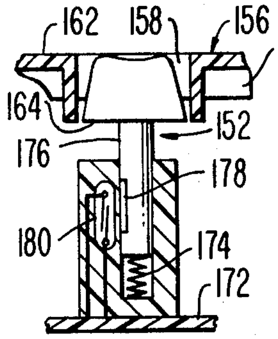
FIG. 8 is an enlarged view partially in section of one of the key switches in relation to the keyboard grid.

A typical key switch 152 is shown enlarged in FIG. 8 in its relationship to the printed circuit board 172 and the keyboard grid 156. The keys 152 maintain their normal position by a resilient member 174 such as a compression spring. The key top 144 is attached to a keystem 176 supporting a magnet 178. Positioned in functional relationship to the magnet 178 is a normally opened magnetic reed switch 180 that is closed when the key top 164 is depressed and the magnet 178 is brought into magnetic coupling with the reed switch 180.

Positioned immediately above the keyboard in FIG. 3 are the control switches 140 and in particular the on-off switch 134. Above the control switches 140 is the acoustic coupler unit 146 wherein the transmission coupler 182 is positioned on an inclined surface 184 to the upper plane 186 of the audio terminal unit 100. The speaker unit 188 and the volume control 132 are positioned to the right of the coupler unit 146 and in particular the axis of the speaker 108 is inclined to the axis of either transducer.

By referring to FIG. 4, there is illustrated in sectional view the mounting of the speaker unit 188 within the audio terminal unit 100. The speaker 108 is mounted at an angle to the base plate 190 of the terminal unit 100 and directed to be substantially in line with the operator. The bracket 192 supporting the speaker 108 is supported on the base plate 190 by a layer 194 of foam or sponge rubber to cushion and prevent the vibrations from the speaker 108 being transmitted to the base plate 190 and from there to the transducers 126 and 128. The bracket 192 is fixedly attached to the base plate 190 by a plurality of non-metallic or nylon fasteners or screws 196 which are isolated from the bracket 192 by means of resilient rubber grommets 198.

Attached to the speaker 108 and extending toward the front of the terminal unit 100 is a megaphone 200 functioning to channel all of the sound waves from the speaker 108 directly out of the terminal unit. By use of the megaphone 200 directing the sound waves towards the operator, the power output of the audio amplifier 130 is effectively reduced. Positioned immediately behind the speaker unit 188 and on the rear wall 202 of the audio terminal unit 100 case are louvers 204 allowing the column of air behind the speaker 108 to escape from inside the unit. The combination of the louvers 204, the megaphone 200 and the cushioned mounting of the speaker 108 to the base plate 190 reduces the output power requirements of the audio amplifier 130 and thereby lessening the coupling of sound and vibration between the speaker 108 and the transducers 126 and 128. Additionally, although not shown in the drawing, the acoustic coupler unit 146 is mounted to the base plate 190 in a similar manner as is the bracket 192 of the speaker, namely cushioned by a foam or sponge rubber pad 194 and secured to the base plate by non-metallic screws 196 which are isolated from the metallic parts.

As indicated above, the amount of air displaced by the speaker 108 when it operates is directly proportional to the amount of electrical power supplied to the speaker coils. By containing and directing the sound waves from the speaker 108 toward the operator a reduction in volume and therefore power is permissible. By placing the louvers 204 immediately behind the speaker 108, the column of air generated by the movement of the speaker 108 is discharged from within the audio terminal unit 100.

In order to more fully reduce any coupling by magnetic fields, the power transformer and the speaker transformer which are not shown, are positioned in front of the speaker unit 188 toward the front of the terminal unit 100. Both transformers are shielded and mounted so that their radiated magnetic fields tend to be cancelled out at the speaker and magnetic transducer by the magnetic fields generated in the speaker coil and the magnetic transducer 126 thereby reducing the cross-coupling effect of the transformers and the transducers 126 and 128.

Figure 9:
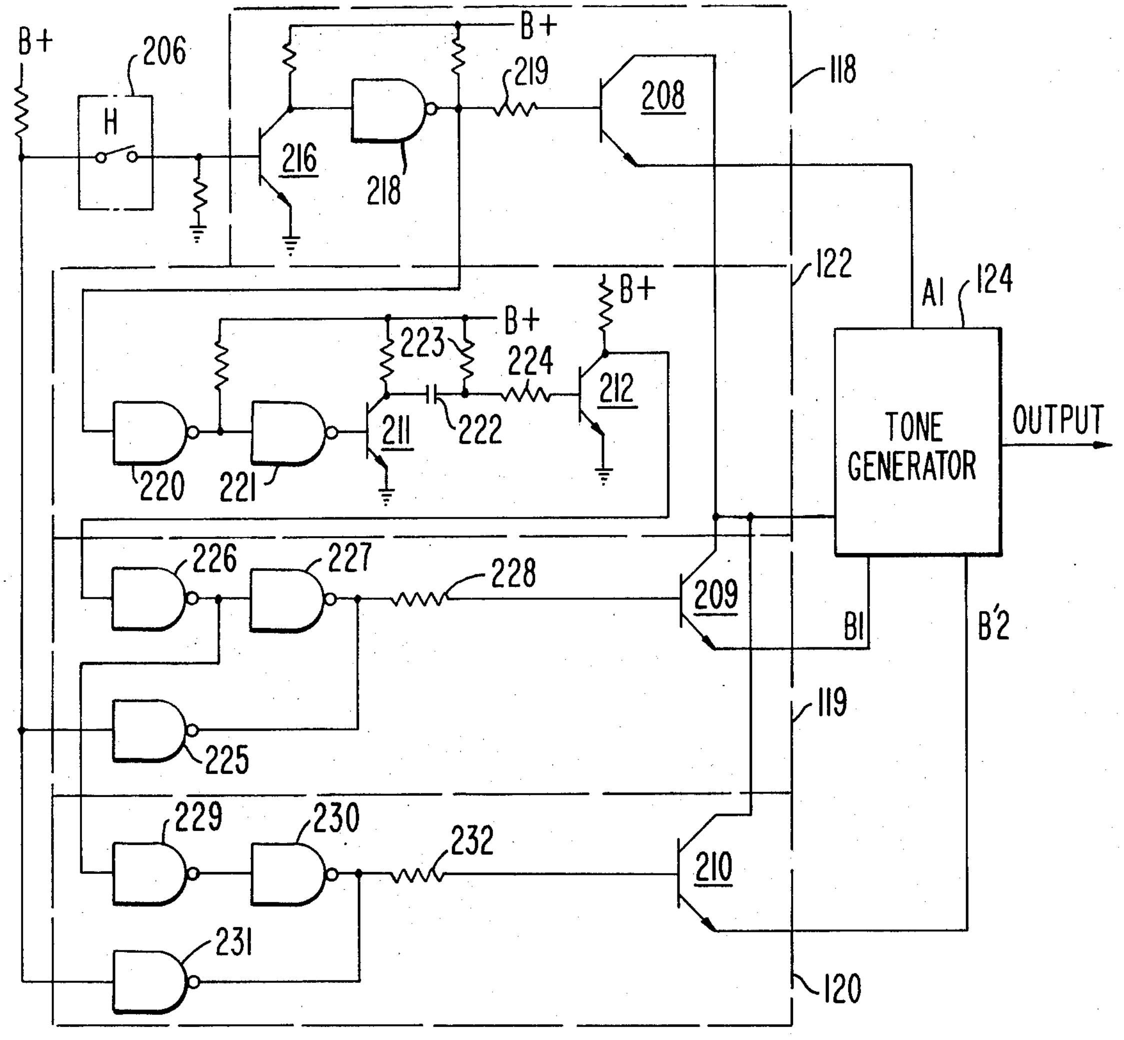
FIG. 9 is a schematic illustrating the generation of the frequency control signals for a typical key of the audio terminal of FIG. 3.

An example of the logic of the terminal unit 100 of FIG. 1, the schematic of FIG. 9 shows the interconnections between the a typical switch or key 206 and the tone generator 124. As indicated on the keyboard chart FIG. 11, the letter H comprises the A1 frequency, the B1 frequency and the B'2 frequency. According to the previous table, the A1 frequency is 697 HZ, B1 frequency is 1,209 HZ and B'2 frequency is 1,336 HZ, and additionally H is key number 16 which is the third key from the left in the second row of the audio terminal unit 100 of FIG. 3.

Figure 10:
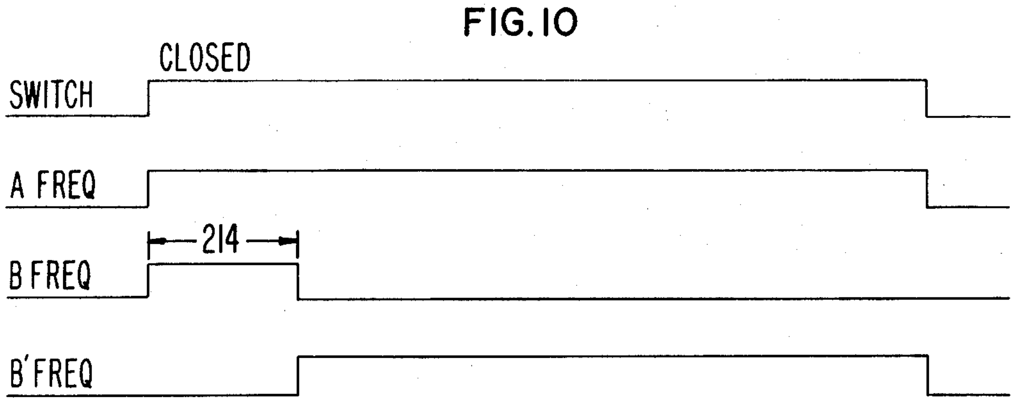
FIG. 10 is a timing diagram showing the relationship of the frequency control signals to the depression of a key.

The logic of FIG. 9 utilizes NAND gates as the logic elements in a positive voltage logic system shown therein. A high voltage is an enabling voltage and conversely a low voltage turns the logic off. The timing diagram of FIG. 10 illustrates the time relationship between the A, B and B' control signals and which is also the frequency generated output from the tone generator 124. In the initial condition with the key switch 206 in its normally opened position, the three transistors 208–210 controlling the A1, B1 and B'2 control signals to the tone generator 124 are normally off. In the delay unit 122 (shown in block form in FIG. 2 and within dash lines in FIG. 9), the first or input transistor 211 is off and the second or output transistor 212 is fully on.

The delay unit 122 is basically a monostable multivibrator wherein the output stage is normally "on" except for a period of time in response to turning on the input stage. Additionally, the delay unit 122 cannot be retriggered while a key is depressed because as will hereinafter be shown, the base of the input transistor 211 is held high.

The first line of the timing diagram (FIG. 10) illustrates the operation of the key switch 206. Simultaneously with the closing of the switch 206, the A control signal and the B control signal are generated. After a predetermined time 214 which is approximately 27 milliseconds, the B control signal is turned off and the B' control signal is generated and remains until the key 206 is released.

Depression of the H key switch 206 causes the first transistor 216 in the A encoder 118 to be driven into conduction. The output of the first NAND gate 218 switches from a low signal level to a high signal level. This high signal level is coupled through a resistor 219 to the base of the output transistor 208 turning that transistor on and generating the A control signal to the tone generator 124. It is seen that the A control signal directly follows the output or the action of the switch or key button 206.

The output signal of the first NAND gate 218 is supplied to the delay unit 122 which comprises a pair of NAND gates 220 and 221 in series with the multivibrator. The two series NAND gates 220 and 221 provide the necessary inversion and drive capabilities in order to turn the multivibrator on. As previously stated, initially the first transistor 211 in the multivibrator is off. The plate of the capacitor 222 nearest the input transistor 211 is therefore charged to the supply voltage. The output transistor 212 is turned on due to the voltage drop across the two resistors 223 and 224 in its base. The plate of the capacitor 22 nearest the output transistor 212 is essentially at the voltage level developed at the intersection of the two base resistors 223 and 224. When the switch 206 is depressed, the base on the input transistor 211 switches from low to high turning on that transistor 211. The voltage on the collector of the input transistor 211 is driven from the value of the supply voltage to essentially ground causing a negative voltage reflection across the capacitor 222 to the base of the output transistor 212. The output transistor 212 is immediately turned off and will remain off until the capacitor 222 recharges to the voltage developed by the two base resistors 223 and 224. As previously indicated, the charge time until the output transistor 212 begins conduction is approximately 27 milliseconds.

The B encoder 119 comprises three NAND gates 225–227 and an output transistor 209. The NAND gates 225–227 are essentially connected so that one NAND gate 225 provides an alternate signal path with the other two NAND gates 226 and 227. The one NAND gate 225 is responsive to the depression of the switch 206 and its output will switch from low to high and will attempt to turn on the output transistor 209. The other two series NAND gates 226 and 227 are responsive to the output of the delay 122.

Initially when the output transistor 212 of the delay unit 122 is on, the output of the other two series NAND gates 226 and 227 is low, and if the switch is not depressed the output of the one NAND gate 225 is also low keeping the output transistor 209 out of conduction. When the delay unit 122 is activated, the output transistor 212 conducts causing the other two series NAND gates 226 and 227 to generate a high output signal at the input to the transistor 209. If the switch 206 is not depressed, the transistor 209 remains off, however in the present example the switch 206 is depressed and the output of the one NAND gate 225 is also high, turning on the output transistor 209. When the delay unit 122 times out, the output of the other two series NAND gates 226 and 227 returns to its low signal turning off the transistor 209 since the voltage at the input to the resistor 228 will seek the lowest voltage supplied thereto.

The B' encoder 120 is similar to that of the B encoder 119 inasmuch as it also comprises three NAND gates 229–231 wherein two NAND gates 229 and 230 are connected in electrical series through the one gate 226 of other two series NAND gates of the B encoder 119 with the output of the delay unit 122 and the third NAND gate 231 is connected in electrical series with the switch 206. The output of the third NAND gate 231 and the output of the two series NAND gates 229 and 230 are coupled together and through a resistor 232 to the transistor 210 generating the B'2 frequency control signal. When the delay unit 122 is operating, the delay output transistor 212 is not conducting and the output of the series NAND gates 229 and 230 is low. However, even though the output of the third NAND gate 231, connected to the switch 206, is high and the input to the base of the B2 transistor 210 is low, the transistor 210 is not conducting. At the end of the delay time, the output of the two series NAND gates 229 and 230 switches to high driving the transistor 210 into conduction.

When the switch 206 is released, the output of the one 218 and third 231 NAND gate connected to the switch 206 become low, turning off the A encoder output transistor 208 and the B' encoder output transistor 210.

There has thus been shown and described an improved audio terminal unit 100 having a keyboard 116 for entering alphanumeric data information. Overlying the keyboard 116 is a recticulated frame or grid 156 for preventing inadvertent depression of two or more adjacent keys 152. Upon depression of a key, a plurality of control signals are generated for actuating a frequency or tone generator 124. The output from the tone generator 124 is coupled by an acoustic transducer 126 to the handset of a telephone 106 for transmission to a central processor 104.

Upon receipt of signals from the central processor 104, the receiving portion of the handset is in an acoustic relationship with a magnetic transducer 128 in the audio terminal unit 100. The sounds from the handset are amplified and broadcast through a speaker 108 to the operator. The speaker 108 is resiliently cushioned from the frame 190 of the audio terminal unit 100 to isolate any vibrations between the speaker 108 and the transducers 126 and 128 and is also provided with a megaphone 200 to reduce the power input to the speaker 108.

What is claimed is:

1. In an audio terminal unit for entering information into a data transmission network through the handset of a telephone operatively coupled to a central processor and including:

a keyboard having a plurality of alphanumeric keys and control keys thereon, encoding means responsive to the actuation of any one of said keys on said keyboard for generating a plurality of frequency control signals in response to said actuated key, a tone generator response to each of said frequency control signals for generating a multiple frequency signal representing said actuated key, and an acoustic transducer responsive to said tone generator for coupling the frequency signals therefrom to the handset, said encoding means comprising:

a first encoder responsive to the activation of any one of said keys on said keyboard for generating a first frequency control signal, a delay means responsive to said first frequency control signal for generating a delay signal for a predetermined time interval, a second encoder responsive both to the continued activation of said one key and the initiation of said delay signal for generating a second frequency control signal, and a third encoder responsive both to the continued activation of said one key and the termination of said delay signal for simultaneously terminating the generation of said second frequency control signal and for generating a third frequency control signal, the generation of said first and third frequency control signals by said first and third encoders continuing until the deactivation of said one key, whereby said tone generator emits one tone constantly, and sequentially emits two other tones during each depression of a key.

2. In an audio terminal unit for entering information into a data transmission network:

a plurality of control switches, a tone generator for generating a multiple frequency signal individually representative of each switch in said plurality of switches, encoding means responsive to the actuation of a selected one of said control switches for generating a set of at least three frequency control signals individually representative of the actuated switch and utilizing such set of frequency control signals for causing the tone generator to produce the multiple frequency signal representative of such actuated switch, said encoding means comprising:

a first encoder responsive to the actuation of the selected control switch for generating the first frequency control signal of said set of frequency control signals which is representative of the actuated switch, circuit delay means operable for a predetermined time period and starting its operation in response to the initiation of said first frequency control signal, a second encoder responsive to both the continued actuation of the selected switch and the start of the operation of said circuit delay means for generating the second frequency control signal of the set of frequency control signals which is representative of the actuated switch, a third encoder for generating the third frequency control signal of the set of frequency control signals which is representative of the actuated switch, and circuit means responsive to both the continued actuation of the selected switch and the expiration of said time delay period for simultaneously terminating the generation of said second frequency control signal by said second encoder and for initiating the generation of said third frequency control signal by said third encoder, the generation of said first and third frequency control signals by said first and third encoders continuing until the deactivation of said selected switch, whereby said tone generator emits one tone constantly and sequentially emits two other tones during the actuation of each said switch.

* * * * *